United States Patent Office 2,711,408
Patented June 21, 1955

2,711,408
PURIFICATION AND SEPARATION OF SAPOGENINS BY ADSORPTION

Monroe E. Wall, Oreland, and Merle M. Krider, Philadelphia, Pa., assignors to the United States of America as represented by the Secretary of Agriculture No Drawing. Application July 29, 1952,
Serial No. 301,614

3 Claims. (Cl. 260—239.55)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to and has among its objects the purification of crude sapogenin mixtures and the separation of such mixtures into their individual components.

Sapogenins are steroidal compounds, some of which serve as useful precursors for cortical and sex hormones. Sapogenins are found in plants in a combined, glycosidal form known as saponins. Upon treatment in a known manner of crude plant extracts with strong, mineral acid, the saponins are hydrolyzed and the sapogenins liberated. Due to the action of the acid, many pigments and resins are formed which make isolation, purification of the sapogenins, and their separation into components difficult.

Often three or four different sapogenins will occur in a single plant species. Since certain of these sapogenins are more useful than others in hormone synthesis, it is desirable to separate them from each other.

For the sake of convenient reference, the more important types of sapogenins are listed below in order of increasing adsorption affinity.

TABLE I

Group 1.—Monohydroxy saturated nonketonic
Group 2.—Monohydroxy unsaturated nonketonic
Group 3.—Monohydroxy saturated ketonic
Group 4.—Monohydroxy unsaturated ketonic
Group 5.—Polyhydroxy saturated nonketonic
Group 6.—Polyhydroxy unsaturated nonketonic
Group 7.—Polyhydroxy saturated ketonic
Group 8.—Polyhydroxy unsaturated ketonic Adsorbents that are most useful in separating the above compounds are alumina, magnesia, and silica gel. The relatively non-polar organ sapogenin solvents that are most useful in order of increasing polarity are hexane, benzene, diethyl ether, chloroform, acetone and methyl and ethyl alcohol.

The general method of approach is to prepare a column of adsorbent such as alumina. On it is placed a solution containing a crude sapogenin mixture such as that derived from Yucca gloriosa. The solvent is selected from the list described above. It is desirable to pick a solvent in which sapogenins are very soluble and which is relatively nonpolar. Benzene fulfills both requirements. The column is then washed with solvent using pressure or vacuum as a means of inducing solvent flow, until the effluent liquor has little or no solids. Then a succession of solvents is passed thru the column, each one being more polar than the preceding one. The first solvent is slightly polar, for example, benzene with 1% chloroform. In this manner, starting with benzene and ending with 20% alcohol in benzene, a mixture of the various sapogenins found in groups 1–8 of Table I may be separated.

At times, derivatives of the sapogenins may be more easily separated. This is particularly true of the polyhydroxy sapogenins listed in groups 5–8 of the table. Owing to the presence of several hydroxyl groups, these compounds are tenaciously adsorbed. Such sapogenins are easily converted to the corresponding esters, such as acetates. The polyhydroxy function is now absent. Such mixtures can be easily resolved and are treated in the same manner as groups 1–4.

Compounds in groups 1–4 of the table can be resolved by starting with benzene and gradually increasing the proportion of chloroform up to 50% chloroform in benzene. Compounds in groups 5–8 are separated by starting with benzene containing 1–2% alcohol and gradually increasing the alcohol concentration to 20% by volume. Other combinations of solvents listed previously may also be used to achieve the same effect.

Example 1

50 grams of crude sapogenin from Yucca gloriosa leaves were chromatographed on 400 grams alumina. The solvent was benzene. The crude sapogenin was contaminated with much dark resinous material. On washing with 500 ml. benzene, 10 grams of essentially resinous material were recovered. Further washing with benzene and 1% chloroform in benzene, resulted in recovery of 5 grams tigogenin (group 1). Next, the column was eluted with 10% chloroform in benzene and 5 grams of hecogenin (group 3) were recovered. Further washing of the column with chloroform and 1% alcohol in benzene, resulted in recovery of 7 grams resin. On washing the column with 5% alcohol in benzene, 4 grams of gitogenin (group 5) containing about 30% manogenin (group 7) were recovered. Further washing with 10% alcohol in benzene resulted in recovery of 6 grams manogenin containing some gitogenin.

A considerable quantity of resin was irreversibly adsorbed on the column. Hence in the example presented, some resin is removed before any sapogenins come off the column and another resinous fraction remains behind after all the sapogenins have been recovered.

The gitogenin-manogenin mixtures in the above example can be further purified by conversion to the acetates followed by a second passage through a new adsorption column. In this case, gitogenin acetate is eluted with 50% hexane in benzene and manogenin acetate by means of 1% chloroform in benzene.

Example 2

The following example shows how two very similar sapogenins can be separated. Two grams of a sapogenin mixture, dissolved in benzene, were chromatographed on 50 grams alumina. By ultra-violet adsorption analysis, the mixture was found to contain 80% hecogenin (group 3), and 20% 9-dehydrohecogenin (group 4). On elution successively with 5, 8, 10, 12 and 15%, chloroform in benzene, the hecogenin was concentrated in the 5, 8 and 10% fraction and its 9-dehydro analogue in the 12 and 15% fractions. The 12 and 15% fratcions were rechromatographed, using the same washing solvents mentioned previously. The 12 and 15% fractions contained 300 milligrams of 9-dehydrohecogenin. The purity of the compound was raised from 20% to 85%.

We claim:

1. A process for the purification and separation of sapogenins of Yucca gloriosa which comprises adsorbing the sapogenin mixture on alumina, washing the alumina with benzene and discarding the impurities thus removed, eluting tigogenin with benzene containing about 1% of chloroform, eluting further impurities with benzene containing about 1% of alcohol, eluting gitogenin admixed with some manogenin with benzene containing about 5% of alcohol, eluting manogenin admixed with some gitogenin with benzene containing about 10% alcohol, thus leaving a substantial proportion of the original impurities adsorbed on the alumina, and recovering the sapogenins from the various eluates.

2. A process for separating a mixture of gitogenin and manogenin which comprises converting them to their acetates, adsorbing the acetates on alumina, eluting gitogenin acetate with benzene containing about 50% of hexane, eluting manogenin acetate with benzene containing about 1% of chloroform, and recovering the gitogenin and manogenin from the solutions of their acetates.

3. A process for separating a mixture of hecogenin and 9-dehydrohecogenin which comprises dissolving the sapogenins in benzene, adsorbing them on alumina, eluting with portions of benzene containing successively about 5, 8, 10, 12 and 15% of chloroform, and recovering hecogenin from the eluates containing 5, 8 and 10% chloroform and 9-dehydrohecogenin from the eluates containing 12 and 15% of chloroform.

References Cited in the file of this patent

UNITED STATES PATENTS 2,152,625     Dirscherl _____ Apr. 4, 1939